Oct. 17, 1967  R. W. E. MOSSE  3,347,014
SEALING OF CARTONS
Filed Jan. 3, 1964  5 Sheets-Sheet 4
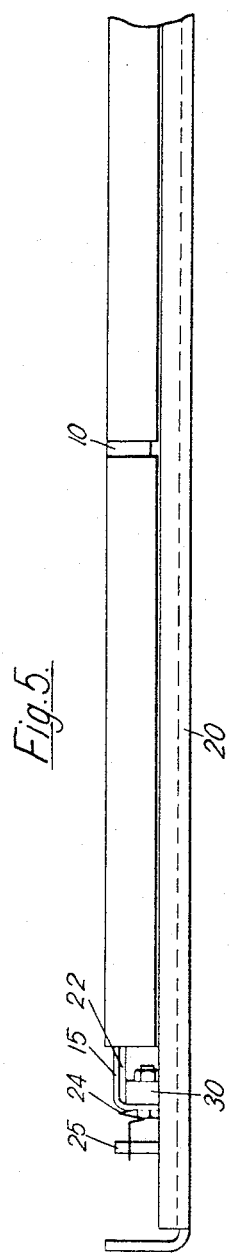
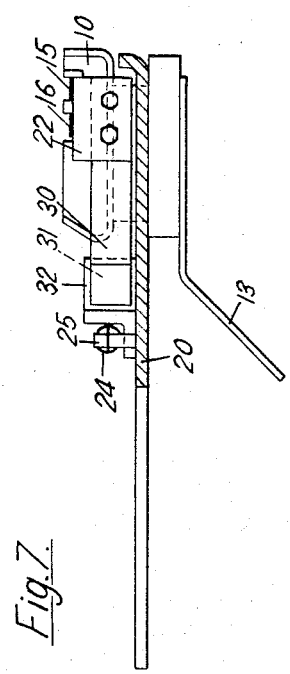
Inventor
RICHARD W. E. MOSSE
By *Emilie V. Smiley*
Attorneys Oct. 17, 1967  R. W. E. MOSSE  3,347,014
SEALING OF CARTONS Filed Jan. 3, 1964  5 Sheets-Sheet 5

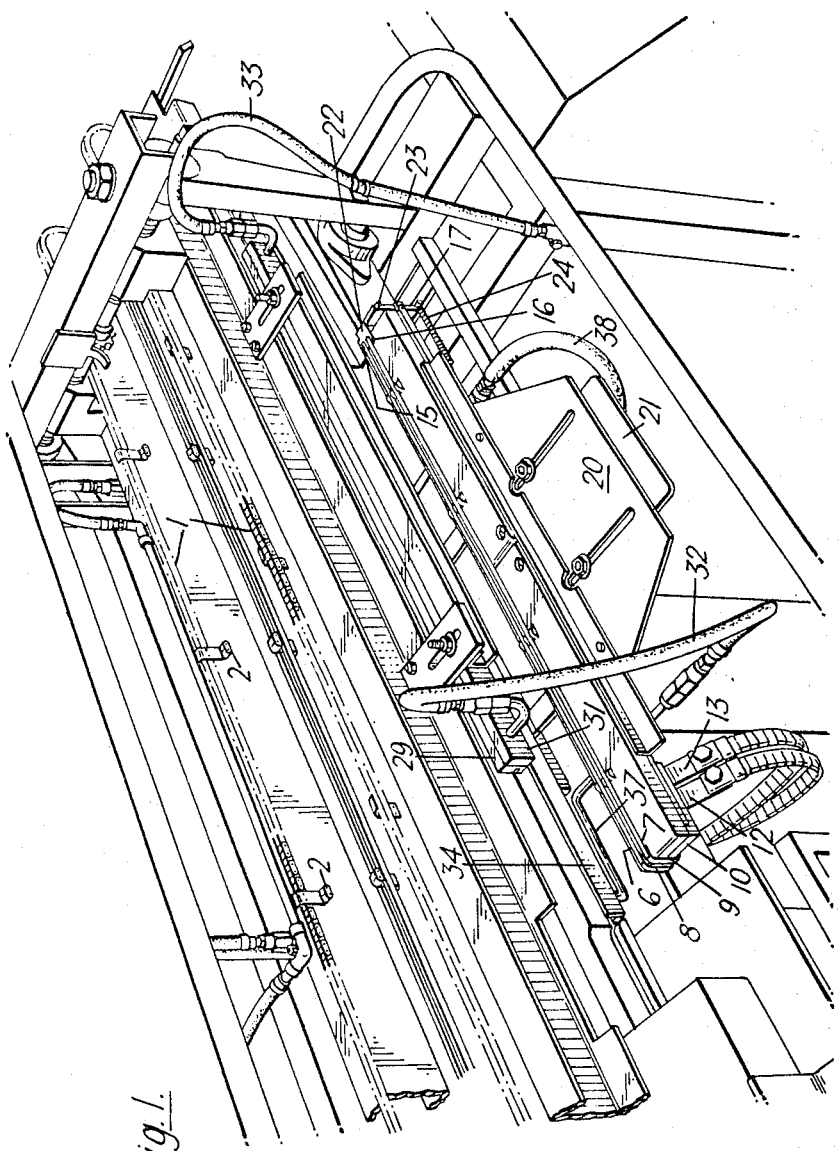

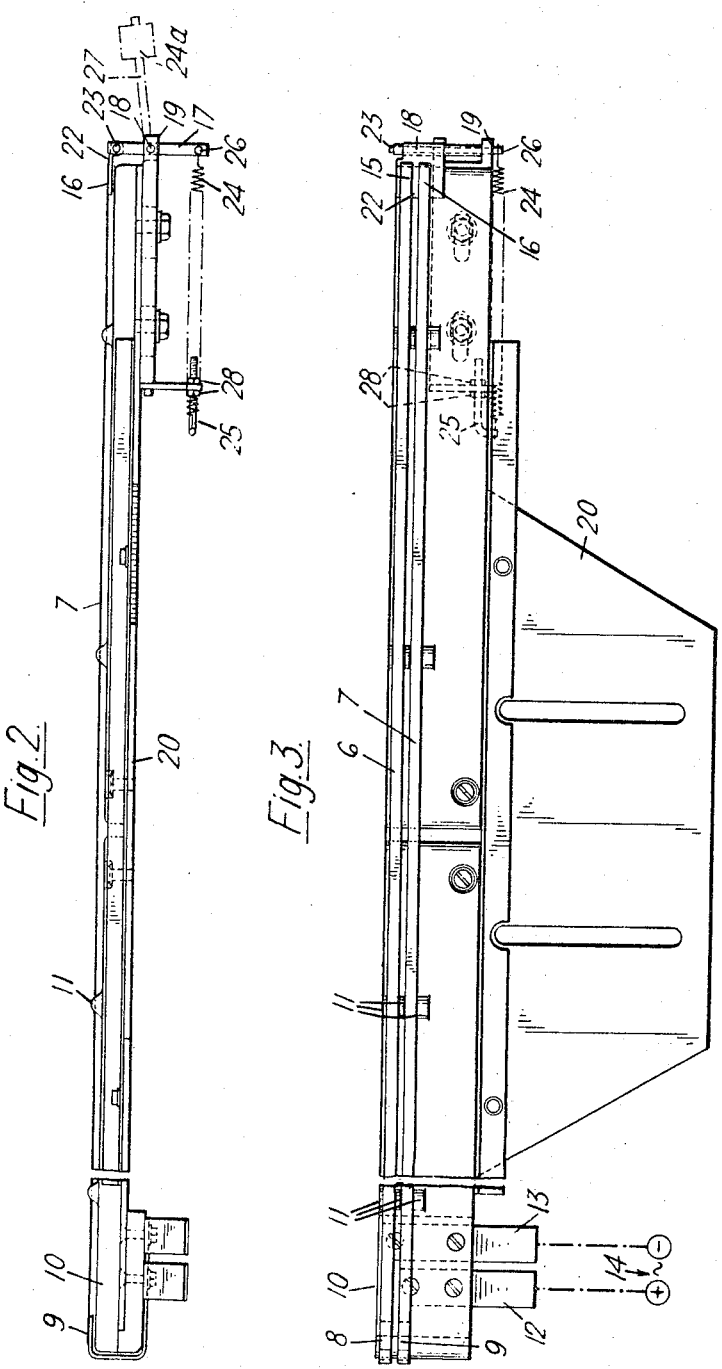

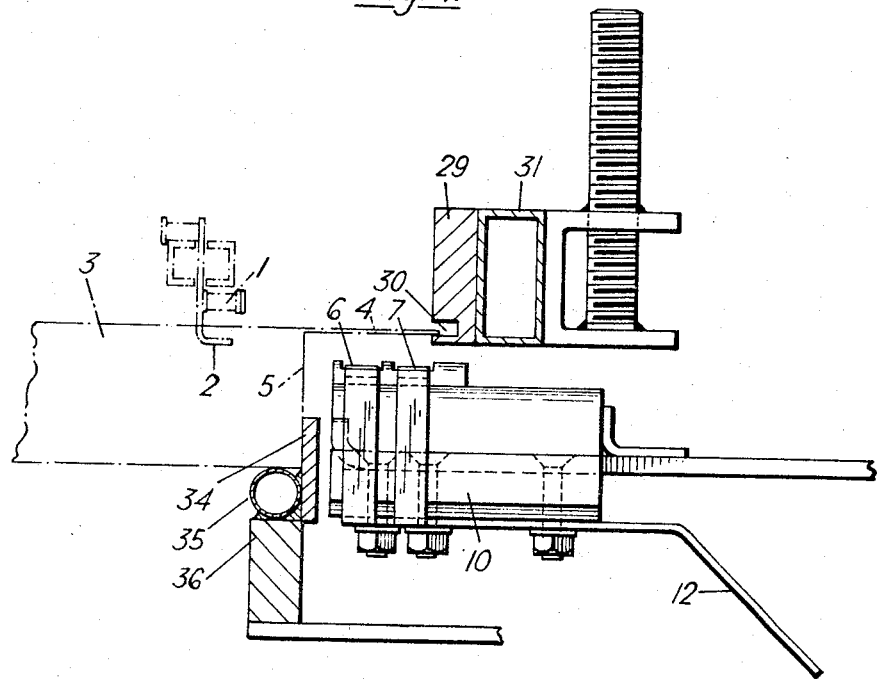

Inventor
RICHARD W. E. MOSSE

By *[signature]*
Attorneys

United States Patent Office 3,347,014
Patented Oct. 17, 1967

3,347,014
SEALING OF CARTONS
Richard Wolfgang Emil Mosse, London England, assignor to The Metal Box Company Limited, London, England, a British company
Filed Jan. 3, 1964, Ser. No. 335,513
Claims priority, application Great Britain, Jan. 11, 1963, 1,461/63
5 Claims. (Cl. 53—141)

ABSTRACT OF THE DISCLOSURE

Apparatus for the sealing of cartons and in particular to the sealing of cartons provided with heat-sealable closure flaps which are movable into heat-sealing relation with the carton portions to which they are to be sealed. A guide groove for the flaps and a guide member for the cartons are both connected with fluid cooled means to enable the application of high temperature heat to the sealing material on the flap.

---

Some forms of carton are made of cardboard or similar material coated with a heat-sealable material, such as polyethylene or a polyethylene/wax mixture, and sealing thereof, following the insertion of the contents into the carton, has been effected by applying heat to the portions thereof which are to be heat-sealed one to the other. With the methods and apparatus used prior to the present invention, the rate of heating of the sealing surfaces has been too slow to achieve commercially acceptable rates of output. Heretofore, the time required to effect the necessary heating of the sealing surfaces has usually been at least four seconds and it is one object of the invention to reduce this time to the order of about one second. It will be understood that when the heating is effected while a carton is being moved continuously in a straight line path the heating time determines the length of the heating means and when the cartons are moved at a rate of about 150 to 200 cartons per minute the length of the heating means must be at least six feet so that the length of the sealing machine is considerable and it is a further object of the invention to reduce the length of the heating means required for such a machine to a length of about twenty inches thus effecting a considerable saving of valuable floor space.

Summary of invention

Apparatus according to the invention is provided with a source of high temperature heat for the purpose of preparing a carton surface to be heat-sealed and one embodiment of such a source contemplates the use of radiant heat using a tape-type heater. With this form of heater, when the tape is raised from an ambient temperature to the working temperature it is subject to considerable expansion which heretofore has resulted in the tape becoming wrinkled and losing its flat condition and this results in loss of efficiency. This tendency can be overcome by applying tension to the tape but the tape has a very low tensile strength and too high a tension results in the tape being thinned and burned out thus necessitating the replacement of the tape. By the present invention there is provided a means of applying a controlled adequate, but low, uniform tension to a tape which ensures the flat condition of the tape and a longer life than has heretofore been found possible.

According to the invention there is provided apparatus for preparing heat-sealable flaps of cartons preparatory to movement thereof into heat-sealing relation with the carton portions to which they are to be sealed, said apparatus comprising conveyor means operable to move cartons in succession in a straight line path, cooled guide means spaced from and extending lengthwise of said path and engageable with a closure flap of a carton to support the flap substantially at right angles to the carton body portion to which it is to be sealed, and at least one radiant heat emitting tape extending lengthwise of said path at a position between said path and said guide means, said tape being spaced from the path of a closure flap supported by said guide means and facing the path of the closure flap so that the intense heat from the tape is localised away from the carton body.

In order that the invention may be clearly understood some embodiments thereof will now be described, by way of example, with reference to the accompanying drawings, in which:

FIGURE 1 is a pictorial view of a part of a carton sealing machine having the invention applied thereto, FIGURE 2 is an elevation of apparatus according to the invention and also, in broken lines, illustrates a modification thereto, FIGURE 3 is a top plan of FIGURE 2, FIGURE 4 is an end elevation, partly in section, of the apparatus.

FIGURE 5 illustrates, in elevation, a modified form of the apparatus shown in FIGURE 2, FIGURE 7 is a section on line VII—VII, FIGURE 6.

In the drawings like or similar parts are indicated by like references.

Figure 6:
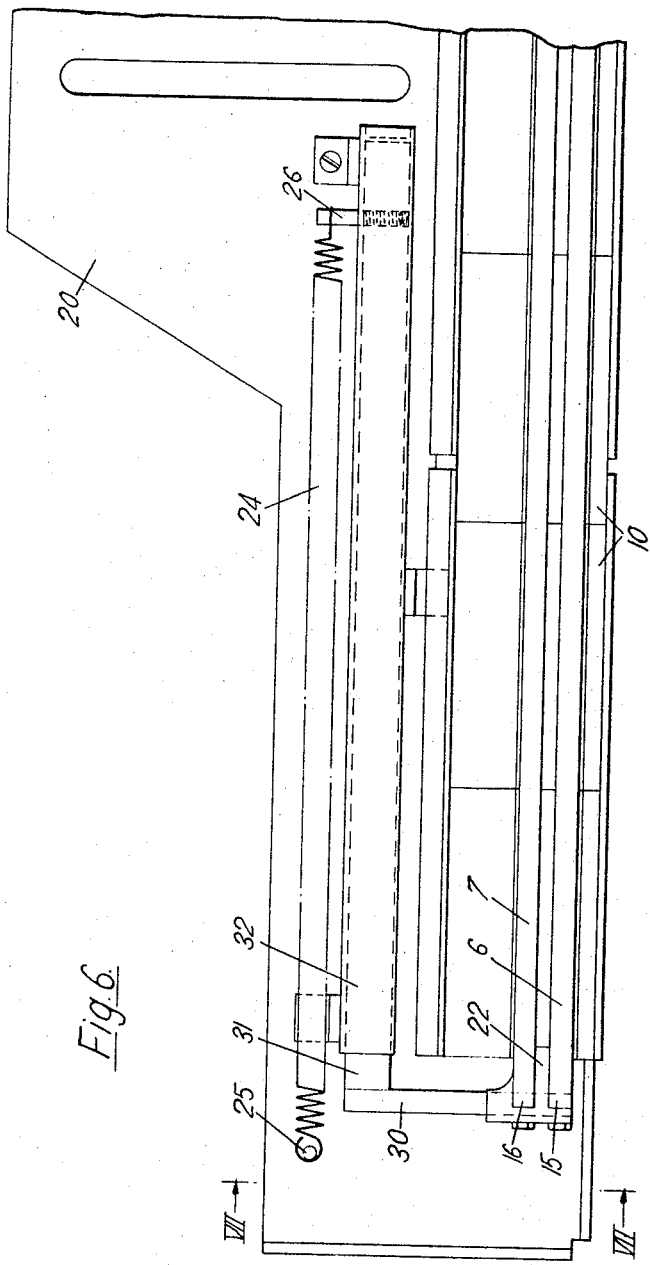
FIGURE 6 is a top plan of FIGURE 5.

Referring to FIGURES 1 to 4 of the drawings, a conveyor comprising continuously movable endless chains 1, FIGURE 1, is provided with pusher elements 2 and is arranged to move cartons 3, FIGURE 4, in succession at right angles to the carton portion 5 to which a flap 4 is to be heat-sealed. FIGURE 4 illustrates only one flap 4 and portion 5 but it will be understood that the opposite side of the carton is also provided with a flap 4 and portion 5.

The closure flaps 4 prior to being folded, by suitable folders, not shown, and pressed into sealing relation with the portions 5 are subjected to heating on the underside thereof to soften the heat-sealing material, for example polyethylene, which has been pre-applied to the carton. This heating is effected by sources of high temperature heat which are arranged to extend lengthwise of the conveyor means on opposite sides thereof.

In the embodiment of the invention shown in the drawings the sources of high temperature heat are radiant heaters and each source comprises at least one electrically conductive tape connectable with a source of electrical energy and having one end anchored and the opposite end connected to tensioning means operable to apply tension to the tape to maintain the tape in a substantially flat condition thereof between the position of anchorage and the position to which the tension is applied to the tape.

FIGURES 2 to 4 illustrate one of the radiant heaters embodied in the machine shown in FIGURE 1 and each heater comprises two electrically conductive tapes 6, 7 anchored respectively at one end 8, 9 thereof to a ceramic support member 10. The tapes 6, 7, which may be made of a nickel alloy about 0.020 inch thick, are located in side-by-side relation by lugs 11 extending from the support member 10 and the anchored ends 8, 9 are connected respectively with electrical contact elements 12, 13 which are connectable with a source 14 of electrical energy.

The ends 15, 16 of the tapes 6, 7 opposite the anchored ends 8, 9 thereof are connected to tensioning means which as shown in FIGURES 2 and 3 comprises a link 17 pivoted at 18 in a bracket 19 adjustably fixed to a frame element 20 by which the heater is attached to a pivoted member 21, FIGURE 1, connected to the machine and arranged to permit the heater to be moved into and out of operative relation with the conveyor means. A connecting element in the form of a plate 22 is connected to the ends 15, 16 of the tapes and is pivoted at 23 to the link 17 and is electrically insulated therefrom. The plate 22 makes electrical connection with the tapes 6, 7 so as to complete the electrical circuit to the source 14. Load-applying means is coupled to the link 17 and is operable to permit rocking of the link 17 about its pivot 18 in response to expansion and contraction of the tapes. Permanent growth which occurs in the length of the tapes 6, 7 is taken up by manual adjustment of the position of the bracket 19 relative to the frame element 21.

In the preferred embodiment the load-applying means comprises a spring 24 connected between a fixed anchorage 25 and an anchorage 26 extending outwards from the link 17. If desired, however, as indicated in broken lines in FIGURE 2, the load-applying means may comprise a weight 24a mounted for adjustment lengthwise of a rod 27 connected with link 17. The load applied by the spring 24 can be adjusted by axial movement of the anchorage 25 following loosening of nuts 28 which retain it in the fixed position thereof.

The closure flap 4 is maintained in substantially constant spaced relation with the tapes 6, 7 by cooled guide means, FIGURE 4, comprising a guide element 29 extending lengthwise of the tapes and having a groove 30 in which an edge portion of the closure flap 4 is locatable. This groove also tends to maintain the closure flap 4 in a substantially flat condition while it is heated by the tapes. The guide element 29 is mounted on a hollow support 31 having tubes 32, 33, FIGURE 1, connected therewith to permit the circulation through the support 31 of a cooling fluid, preferably water.

The apparatus also preferably includes cooled guide members 34 which extend lengthwise of the tapes 6, 7 and engage the carton portions 5 at positions adjacent those to be engaged by the heat-treated portions of the closure flaps 4. The guide members 34 are connected to tubes 35 carried by rails 36 and the tubes 35 are connected with pipes 37, 38, FIGURE 1, which permit cooling fluid, preferably water, to be circulated through the tubes 35.

From the foregoing description it will be understood that the surface of a flap 4 which is to be moved into heat-sealing relation with a carton portion to which the flap is to be heat-sealed is maintained in substantially constant spaced relation with the radiant-heater tapes 6, 7. This arrangement permits the heating to be effected by high temperature heat of the order of 1,100° C. with the flaps spaced from the tapes by a distance of about 3/16 inch and when cartons are fed at a rate of about 150 to 200 per minute the length of the tapes is only about 30 inches.

FIGURES 5 to 7 illustrate a modified form of the apparatus described above with reference to FIGURES 2 to 4. In this form of the apparatus the ends 15, 16 of the tapes 6, 7 are connected to the plate 22 which in turn is secured to a bar 30 carried by a slide 31. The slide 31 is slidable lengthwise in a guide member 32 secured to the frame element 20. The load-applying spring 24 is anchored at one end to a fixed anchorage 25 and at the other end is attached to an anchorage 26 extending outwards from the slide 31 and through a slot 33 extending lengthwise of the guide member 32. With this form of the apparatus the slide 31 moves lengthwise in the guide member 32 in response to expansion and contraction of the tapes 6, 7 which in this embodiment of the apparatus are located in recessed channels formed in the support member 10 which consists of four ceramic blocks, to prevent damage to the tapes by crumpled pieces of carton board. This embodiment of the apparatus permits permanent growth which occurs in the length of the tapes 6, 7 to be taken up automatically.

The method and apparatus herein described is of particular use in the sealing of cartons containing frozen goods because the intense softening heat is localised away from the body of the cartons.

I claim:

1. Apparatus for preparing heat-sealable flaps of cartons preparatory to movement thereof into heat-sealing relation with the carton body portions to which they are to be sealed, said apparatus comprising conveyor means operable to move cartons in succession in a straight line path, guide means mounted on a hollow support and spaced from and extending lengthwise of said path and engageable with a closure flap of a carton to support the flap substantially at right angles to the carton body portion to which it is to be sealed, at least one radiant heat emitting tape extending lengthwise of said path at a position between said path and said guide means, said tape being spaced from the path of a closure flap supported by said guide means and facing the path of the closure flap so that the intense heat from the tape is localised away from the carton body, tubes connected with said hollow support to supply cooling fluid for circulation through the support.

2. Apparatus according to claim 1 in which the tape has one end anchored and the opposite end connected to tensioning means operable to apply tension to the tape and including a pivoted link, a connecting element pivoted to the link and connected to said opposite end of the tape, means insulating said connecting element from said link, electric supply means connected with said connecting element, and load-applying means coupled to the link and operable to permit rocking of the link about the pivot therefor in response to expansion and contraction of the tape.

3. Apparatus for preparing heat-sealable flaps of cartons preparatory to movement thereof into heat-sealing relation with the carton body portions to which they are to be sealed, said apparatus comprising conveyor means operable to move cartons in succession in a straight line path, cooled guide means spaced from and extending lengthwise of said path and engageable with a closure flap of a carton to support the flap substantially at right angles to the carton body portion to which it is to be sealed, and at least one radiant heat emitting tape extending lengthwise of said path at a position between said path and said guide means, said tape being spaced from the path of a closure flap supported by said guide means and facing the path of the closure flap so that the intense heat from the tape is localized away from the carton body, said cooled guide means comprising a water-cooled guide element extending lengthwise of the source of high temperature heat and having a groove which extends lengthwise thereof and in which an edge portion of the closure flap is locatable while the flap is subjected to the action of the source of high temperature radiant heat.

4. Apparatus for preparing heat-sealable flaps of cartons preparatory to movement thereof into heat-sealing relation with the carton body portions to which they are to be sealed, said apparatus comprising conveyor means operable to move cartons in succession in a straight line path, cooled guide means spaced from and extending lengthwise of said path and engageable with a closure flap of a carton to support the flap substantially at right angles to the carton body portion to which it is to be sealed, and at least one radiant heat emitting tape extending lengthwise of said path at a position between said path and said guide means, said tape being spaced from the path of a closure flap supported by said guide means and facing the path of the closure flap so that the intense heat from the tape is localized away from the carton body, a cooled guide member extending lengthwise of the source of high temperature radiant heat and arranged to engage the carton portion to which the closure flap is to be heat sealed at a position adjacent that which is to be engaged by the heat-treated portion of the closure flap, a tube connected to said guide member, and pipes connected with said tube for supplying cooling fluid to be circulated through the tube.

5. Apparatus for preparing heat-sealable flaps of cartons preparatory to movement thereof into heat-sealing relation with the carton portions to which they are to be sealed, said apparatus comprising conveyor means by which cartons are movable in succession with a closure flap of each carton extending outwards at an angle to the carton portion to which it is to be heat-sealed, a source of high temperature heat disposed lengthwise of said conveyor means, guide means extending longitudinally of said conveyor means and having a groove extending lengthwise thereof and in which an edge portion of the closure flap is locatable while the flap is subjected to the action of said source of high temperature heat, a fluid cooled guide element extending lengthwise of said guide means and source of high temperature heat, a guide member extending lengthwise of said conveyor means and engageable with the carton portion to which the closure flap is to be heat-sealed at a position adjacent that which is to be engaged by the heat-treated portion of the closure flap, a tube connected to said guide member, and pipes connected with said fluid-cooled guide element and to said tube for supplying cooling fluid to be circulated therethrough.

References Cited

UNITED STATES PATENTS

| | | | |
|---|---|---|---|
| 2,169,311 | 8/1939 | Widell | 93—49 |
| 2,423,237 | 7/1947 | Haslacher | 154—42 |
| 2,582,581 | 1/1952 | Bona | 156—282 X |
| 2,606,850 | 8/1952 | Piazze | 156—499 X |
| 2,660,219 | 11/1953 | Haas et al. | 156—498 X |
| 2,708,648 | 5/1955 | Ulmschneider | 53—141 X |
| 2,783,693 | 3/1959 | Felber | 53—375 X |
| 2,788,838 | 4/1957 | Crabbe et al. | 156—498 X |
| 3,130,649 | 4/1964 | Striplin et al. | 156—282 X |
| 3,241,291 | 3/1966 | Monroe et al. | 53—375 X |
| 3,248,843 | 5/1966 | Winter et al. | 53—141 X |

TRAVIS S. McGEHEE, Primary Examiner.

FRANK E. BAILEY, Examiner.

L. S. BOUCHARD, Assistant Examiner.